United States Patent [19]

Watari

[11] Patent Number: 4,910,782
[45] Date of Patent: Mar. 20, 1990

[54] SPEAKER VERIFICATION SYSTEM

[75] Inventor: Masao Watari, Tokyo, Japan

[73] Assignee: NEC Corporation, Tokyo, Japan

[21] Appl. No.: 396,809

[22] Filed: Aug. 22, 1989

Related U.S. Application Data

[63] Continuation of Ser. No. 52,819, May 22, 1987, abandoned.

[30] Foreign Application Priority Data

May 23, 1986 [JP] Japan .............................. 61-119456
May 23, 1986 [JP] Japan .............................. 61-119457

[51] Int. Cl.$^4$ .............................................. G10L 5/06
[52] U.S. Cl. ...................................................... 381/42
[58] Field of Search ................................. 381/41–46; 364/513.5

[56] References Cited

U.S. PATENT DOCUMENTS

| | | | |
|---|---|---|---|
| 3,673,331 | 6/1972 | Hair et al. | 381/42 |
| 3,700,815 | 10/1972 | Doddington et al. | 381/42 |
| 4,581,755 | 4/1986 | Sakoe | 381/42 |
| 4,653,097 | 3/1987 | Watanabe et al. | 381/42 |
| 4,694,493 | 9/1987 | Sakoe | 381/42 |
| 4,716,593 | 12/1987 | Hirai et al. | 381/42 |
| 4,723,290 | 2/1988 | Watanabe et al. | 381/43 |

OTHER PUBLICATIONS

Leung et al., "A Procedure for Automatic Alignment of Phonetic Transcriptions with Continuous Speech", IEEE ICASSP 84, pp. 2.7.1–2.7.4.

Primary Examiner—Gary V. Harkcom
Assistant Examiner—John A. Merecki
Attorney, Agent, or Firm—Sughrue, Mion, Zinn, Macpeak & Seas

[57] ABSTRACT

Control reference pattern candidates corresponding to a verification reference patterns of a registered speaker are synthesized by connecting unit speech patterns of a plurality of speakers. A plurality of control reference patterns similar to the verification reference pattern are determined from among the control reference pattern candidates. First dissimilarity between an input pattern of a speaker to be verified and the verification reference pattern specified by the registered speaker and second dissimilarity between the input pattern and the control reference patterns specified by the registered speaker are calculated. The speaker to be verified is judged as the registered speaker on the basis of the first and second dissimilarities.

11 Claims, 3 Drawing Sheets

SPEAKER VERIFICATION SYSTEM

This is a continuation of application Ser. No. 07/052,819, filed May 22, 1987, now abandoned.

BACKGROUND OF THE INVENTION

This invention relates to a speaker verification system.

A speaker verification system determines whether or not a speaker is the registered person by comparing a password speech uttered by the speaker with a reference password speech that has been registered in advance. Such a system is useful as identification-verifying means instead of signature in a bank business or as check-in and check-out control systems, and its practical realization has been expected.

In the conventional speaker verification system, the password speech pattern uttered by a registered speaker is stored as a reference pattern, and at the time of verification, a code specifying the speaker (hereinafter called simply the "registered speech number") and the password spoken by a speaker to be verified are inputted. The reference pattern specified by the registered speaker number and the uttered speech pattern of the password (hereinafter called the "input pattern") are compared with each other to calculate the distance therebetween (an evaluation value of dissimilarity between the patterns). If this distance is smaller than a predetermined threshold value, the speaker is judged to be the registered person, and if the distance is greater, on the contrary, the speaker is judged to be an imposter.

The problem with such a speaker verification system lies in the difficulty in the determination of the threshold value. In other words, even when the same person utters a predetermined password, the uttered password pattern varies from time to time, and the degree of this change varies from person to person. Therefore, if the threshold value is set to be large enough to solve this problem, an imposter is frequently misjudged to be the registered person, whereas if the threshold value is set to be smaller, the registered person may be rejected as an imposter.

U.S. Pat. No. 4,581,755 and U.S. Pat. No. 4,694,493 disclose a system which solves the problem of the conventional speaker verification system described above. In accordance with this prior art system, not only the reference pattern of a registered person (hereinafter called the "verification reference pattern") is registered in advance but also the speech pattern of other person which is similar to the verification reference pattern is registered as a control reference pattern are registered in advance. When he input pattern satisfies the following conditions (A) and (B) on the distance between the patterns, the speaker is judged to be registered person and a coincidence signal is generated:

(A) the distance between the input pattern and the verification reference pattern is less than the distance between the input pattern and the control reference pattern; and (B) the distance between the input pattern and the verification reference pattern is less than a predetermined threshold value.

According to this system, the threshold value to be used in the condition (B) can b set more loosely, and the possibility of misjudgement of the true registered speakers as impostors can be reduced. Moreover, the false acceptance of impostors as true registered speakers can be prevented, too, by the condition (A).

In this prior art system described above, patterns of other persons similar to (having small distance from) the verification reference pattern of the password are selected as the control reference patterns. As a result, the patterns of a large number of speakers must be prepared to provide the patterns of other persons, and when the password varies for each registered person, the patterns of a large number of speakers must be prepared for each of these different passwords. If the system is applied to verify an unlimited number of persons, therefore, it has been very difficult to obtain the control reference patterns.

SUMMARY OF THE INVENTION

It is, therefore, an object of the present invention to provide a speaker verification system using control reference patterns which can drastically reduce a necessary memory capacity.

It is another object of the present invention to provide a speaker verification system capable of improving recognition rate.

It is still another object of the present invention to provide a speaker verification system with no limitation to passwords.

According to the present invention, a speaker verification system includes a verification reference pattern memory addressed by speaker identification numbers identifying registered speakers including a speaker whose identity is to be verified. The verification reference pattern memory also memorizes verification reference patterns representative of passwords spoken by registered speakers. A speech segment memory memorizes speech segment patterns representative of predetermined speech segments spoken by speakers including the speaker whose identity is to be verified. Control reference pattern candidates representative of the passwords are synthesized by connecting the speech segment patterns. The similarities between the verification reference patterns and the control reference pattern candidates are calculated and a predetermined number of control reference patterns are selected based upon the dissimilarities.

To identify a speaker, a speaker identification number is input to the speaker verification system along with an input pattern representing one of the spoken passwords corresponding to a stored verification reference pattern. A first dissimilarity is calculated between the input pattern and the verification reference pattern accessed by the input identification number. A second dissimilarity between the input pattern and each of the control reference patterns is also calculated. Finally, a judgment is made whether or not the speaker to be verified is one of the registered speakers based upon the first and second dissimilarities.

Other objects and features will be clarified from the following explanation with reference to the drawings.

DESCRIPTION OF THE PREFERRED EMBODIMENTS

Figure 1:
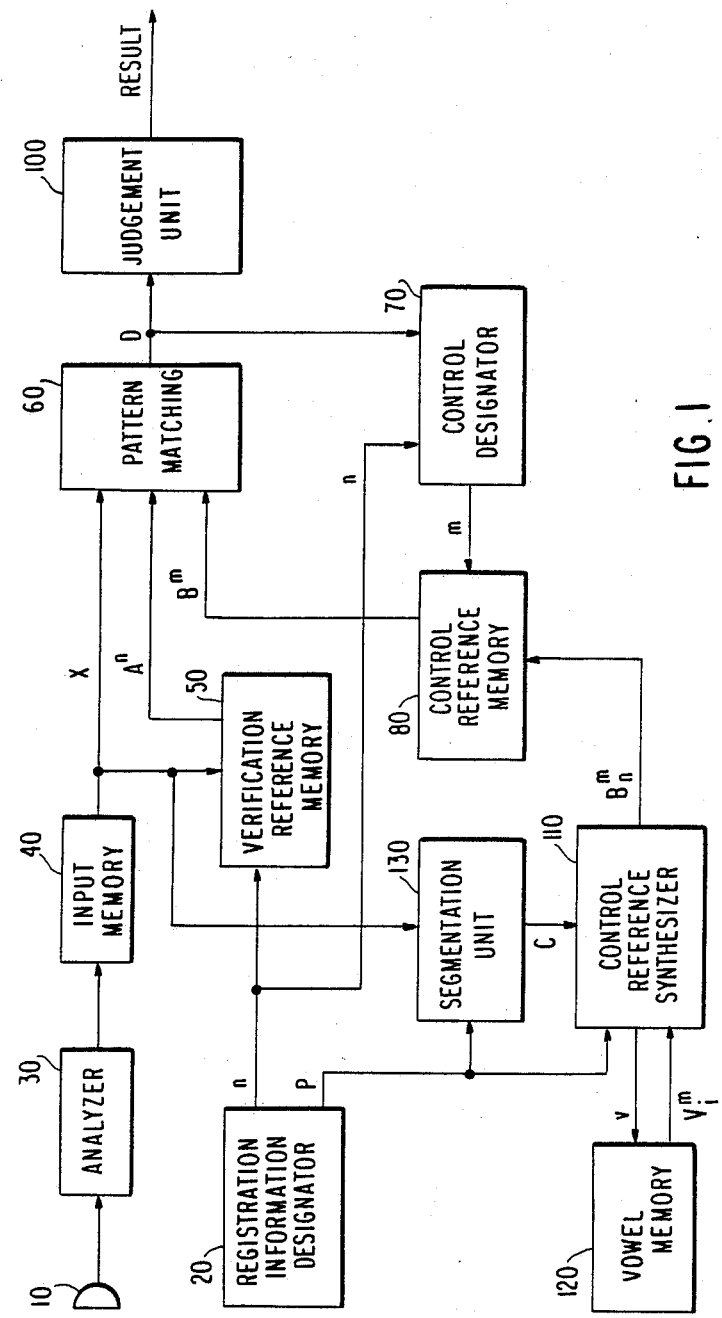
FIG. 1 is a block diagram showing one embodiment of the present invention.

In a speaker verification system using a control reference pattern, the present invention synthesizes the control reference pattern candidates by use of a plurality of unit speech patterns that have been prepared in advance. From among these control reference pattern candidates, a plurality of the pattern candidates which are similar to the verification reference pattern of a password are selected as a set of the control reference patterns. Various patterns can be used as the unit speech pattern, such as syllabic patterns and phonemic patterns of a large number of speakers, their combinations, vowel patterns connected to consonants and word patterns. This embodiment will illustrate the case where the combination of the consonant and the vowel patterns and the combination of the word patterns are used as the control reference patterns.

The advantage of using the combination of consonant and vowel patterns is as follows. Generally, it is difficult to collect or obtain every phonemic or syllabic patterns of a large number of speakers because a great many kinds of phonemes and syllables exist. On the other hand, features of individuality necessary for speaker verification are contained more in the vowels than in the consonants. In addition, the number of kinds of vowels is by far smaller than that of consonants, and vowels are about a dozen or so such as /i/, /I/, /e/, /ɛ/, /æ/, /a/, /ɔ/, /N/, /ʔ/, and so forth. These vowels can be collected relatively easily. Therefore, the control reference patterns having the features of a large number of speakers can be formed easily by synthesizing the control reference patterns from the vowel patterns of many (unspecified) speakers and the consonants of the registered speakers. Since nasals among the consonants exhibit great individual dependence (or their patterns vary greatly depending on speakers), phonemes exhibiting a great and a small individual differences can be preferably divided from one another. First embodiment will represent the case where the vowels and the consonants are separated from one another. The use of the word patterns as the control reference patterns provides the advantage that the words can be handled more easily than the phonemic and syllabic patterns. More specifically the segmentation of the phonemes and syllables is difficult, whereas the segmentation of the words can be made more easily because speaking words separatedly or isolatedly (isolated word pronunciation) is possible.

In the first embodiment, the train of vowels appearing in the verification reference pattern (the pattern X obtained from the password "Massachusetts", for example, uttered by the speaker) is sequentially expressed as follows:

$$V(1), V(2), \ldots, V(T) \tag{1}$$

where T is the number of vowels.

The vowel portions of the verification reference pattern expressed above are replaced by the vowel patterns of a large number of (unspecified) speakers, for the synthesis with the proviso that the speaker of the vowel pattern to be replaced is different from the speaker of the verification reference pattern. The vowel pattern train used for this synthesis is expressed as follows:

$$V^m(1), V^m(2), \ldots, V^m(T), m \neq n \tag{2}$$

where n represents the speaker of the verification reference pattern, and more particularly, n represents a numeral alloted to the speaker to be verified and m represents a speaker among a large number of speakers.

Thus a plurality of control reference pattern candidates are generated. Pattern matching is effected between these control reference pattern candidates and the verification reference pattern to determine the distance between them. From among the control reference pattern candidates, k control reference pattern candidates providing the 1st to k-th smallest distances are selected as the control reference patterns. For the verification, a distance between the input pattern of the speaker to be verified and the verification reference pattern and distances between the input pattern and the control reference patterns are determined in order to judge whether or not the speaker is the registered person, on the basis of these two kinds of distances.

FIG. 1 is a block diagram showing one embodiment of the present invention described above. A vowel pattern memory 120 stores in advance the vowel patterns of a large number of (unspecified) speakers. For instance, the vowel patterns [a], [æ], [ə], [u], [o], [i], [e] and [ɔ] for 1,000 speakers are prepared. It will be assumed hereby that the set of these vowel patterns is expressed as:

$$\{V_i^m; i=[\mathrm{a}], [æ], \ldots, [ɔ]; m=1, 2, \ldots, 1000\} \tag{3}$$

where i represents a vowel category and m represents a speaker number.

First of all, the registration operation will be explained. A registration information designator 20 consists of a keyboard, and information on the person to be registered, that is, the registered speaker number n, is inputted from this keyboard. Then, the password /Massachusetts/ (pronunciation [mæ s ə čusits]) is inputted as a pronunciation code from the designator 20, and a pronunciation signal P is generated. The corresponding password speech is inputted from a microphone 10. This speech signal is analyzed by an analyzer 30 and the result of analysis (hereinafter called "input pattern X" shown in FIG. 2A) is stored in an input pattern buffer 40. This input pattern X is made to correspond as a verification reference pattern $A^n$ for the speaker number n and is stored in a verification reference pattern memory 50 at an address n.

Segmentation unit 130 segments the input pattern X read from the input pattern buffer memory 40, or separates a consonant portion from a vowel portion. This segmentation can be made manually but can also be made automatically. Automatic segmentation can be made by using so-called "automatic transcription alignment" which determines the time of the input pattern corresponding to the speech transcription information of the password pronunciation from the registration information designator 20. (Refer, for example, to Hong C. Leug et al, "A procedure for Automatic Alignment of Phonetic Transcriptions with Continuous Speech", Proceedings of IEEE, International Signal Processing (Proceedings ICASSP 84), 1984, p.p. 2.7.1–2.7.4.)

Figure 2A:
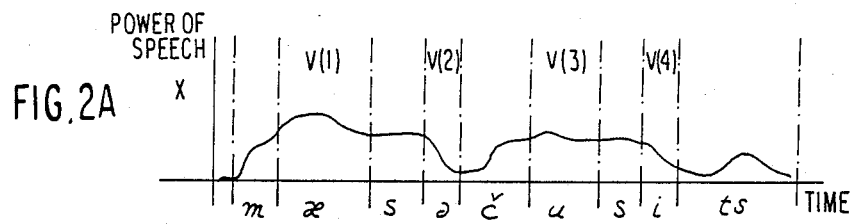
FIGS. 2A to 2D are explanatory views useful for explaining the operation of the embodiment shown in FIG. 1.
Figure 2B:
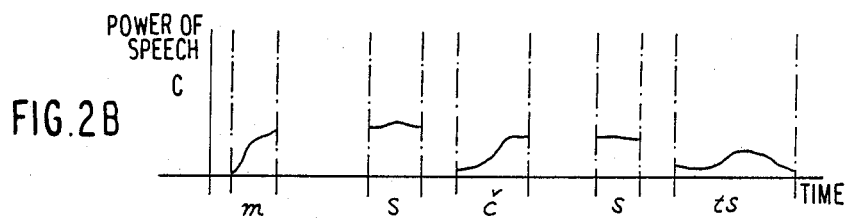

In the password /Massachusetts/, the consonants are [m, s, č, s, ts] while the vowels are [æ, ə, u, i], and segmentation is made such as shown in FIG. 2A. The consonant portion is delivered as a consonant pattern train C (see FIG. 2B) to a control reference pattern synthesizing unit 110.

The vowel pattern memory 120 stores the vowel patterns $V_i^m$ (expressed by formula (3)) uttered by a large number of people (e.g. 1,000 people).

Figure 2C:
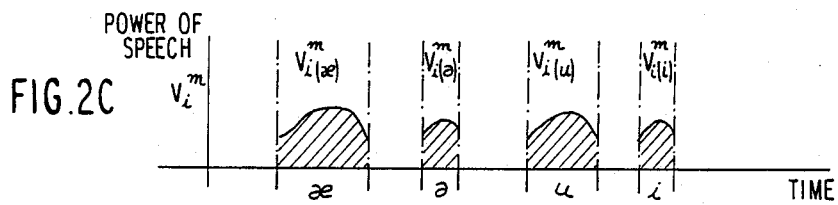
Figure 2D:
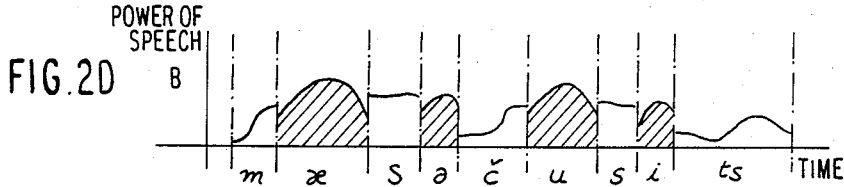

The control reference pattern synthesizing unit 110 synthesizes the control reference pattern on the basis of the consonant pattern C from the segmentation unit 130 and the vowel pattern $V_i^m$ from the vowel pattern memory 120. That is, the synthesizing unit 110 receives the pronunciation signal P, generates a vowel information signal V on the basis of the pronunciation signal P, and reads out sequentially the vowel patterns $V_i^m$ (FIG. 2C) of a large number of speakers (m=1~1,000) belonging to each vowel category i from the vowel pattern memory 120 in response to the vowel information signal v. For example, it reads out the vowel pattern series $V_{[æ]}^1, V_{[ə]}^1, V_{[u]}^1, V_{[ɪ]}^1, \ldots, V_{[æ]}^2, V_{[ə]}^2, V_{[u]}^2, V_{[ɪ]}^2, \ldots, V_{[æ]}^{1000}, V_{[ə]}^{1000}, V_{[u]}^{1000}, V_{[ɪ]}^{1000}$ of m speakers (m=1, 2, ..., 1000). The control reference pattern synthesizing unit 110 connects this vowel train $V_i^m$ (FIG. 2C) to the consonant pattern train C (FIG. 2B), and prepares and outputs the 1,000 control reference pattern candidates $B^m$ (FIG. 2D).

A control reference pattern memory 80 stores temporarily the control reference pattern candidate $B^m$ obtained in the manner described above, and outputs them to the pattern matching unit 60.

The pattern matching unit 60 calculates the distance $D(X, B^m)$ between the input pattern X and the control reference pattern $B^m$ and sequentially supplies the distance D to a control designation unit 70.

The control designation unit 70 compares the distances $D(X, B^m)$ that are inputted sequentially and determines the five smallest distances from among them, for example, and the number m corresponding to each of these distances are sent to the control reference pattern memory 80. The control reference pattern memory 80 eliminates the patterns other than the five control reference pattern candidates corresponding to the numbers m.

The control designation unit 70 stores these numbers m in correspondence to the registered speaker number n in the following form:

$$m(n, 1), m(n, 2), \ldots, m(n, 5) \quad (4)$$

In this manner the verification reference pattern $A^n$ is obtained and preparation of control reference designation is made as expressed by the formula (4). The processing described above is repeated while changing the registered number n whenever a new person to be registered appears.

Next, the verification operation will be explained. The speaker to be verified operates the key of the registration information designator 20, inputs the registered number n to specify the speaker to be verified, and inputs the speech of the password /Massachusetts/ from the microphone 10. The password speech is analyzed by the analyzing unit 30 in the same way as at the time of registration, and inputted as tee input pattern X to the input pattern buffer 40.

In response to the input of the registered number n to the verification reference pattern memory 50, the verification reference pattern $A^n$ is outputted. The pattern matching unit 60 calculates the distance $D(X, A^n)$ between the patterns X and $A^n$.

The registered number n is also sent to the control designation unit 70 from which the control reference pattern designation signal m of the formula (4) is outputted. The control reference pattern $B^m$; {m=m(n, 1), m(n, 2), ..., m(n, 5)} is read out from the control reference pattern memory 80 in accordance with the signal m.

The pattern matching unit 60 calculates the distances between the input pattern X and these control reference patterns $B^m$; $d(X, B^m)$; {m=m(n, 1), m(n, 2), ..., m(n, 5)}.

The judgment unit 100 compares the distances and determines the speaker as the registered person only when $D(X, A^n)$ is smaller than all the distances $D(X, B^m)$ and $D(X, A^n)$ is smaller than a predetermined threshold value.

Though the embodiment described above uses the distances for comparing the speech patterns, correlation (similarity) may be used. In this case, the direction of inequality of the judgment standards (A) and (B) becomes obviously opposite. As the judgment standard, it is possible to use the condition that the distance from the control reference pattern is greater than a second threshold value, in place of the condition (A). In the embodiment described above, the pronunciation code of the verification reference pattern is inputted from outside through the keyboard in order to synthesize the control reference pattern candidates, but it is possible to synthesize all the combinations while assuming that the vowel train is unknown and to select the smallest distances by pattern matching to obtain the control reference patterns.

Furthermore, the control reference pattern synthesizing unit 110 forms the control reference patterns by directly connecting the vowel pattern with the consonant pattern, but various methods of speech synthesis can be applied such as by making extrapolation of consecutive informations in such a manner as to smoothly continue in the proximity of the connection portion by adding while weighting them.

Figure 4:
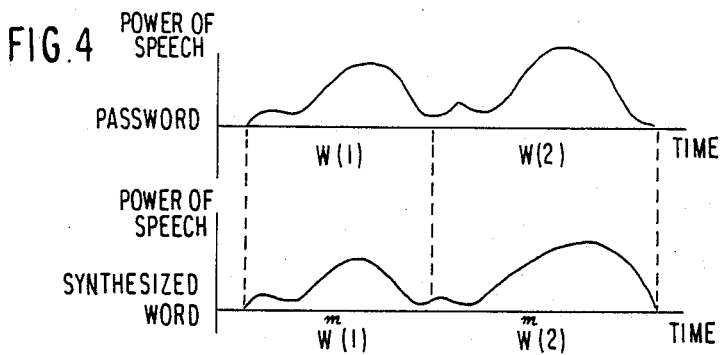
FIG. 4 is an explanatory view useful for explaining the operation of the embodiment shown in FIG. 4.

Next, the second embodiment of he invention will be given. In this embodiment, the unit speech pattern, which is used to synthesize the control reference pattern, is assumed to be word. The control reference pattern candidates are synthesized by connecting word patterns uttered by speakers other than the registered speaker (FIG. 4), and the candidates similar to the verification reference pattern are selected as the control reference patterns.

The train of words appearing in the verification reference pattern is expressed as follows:

$$W(1), W(2), \ldots, W(T) \quad (5)$$

where T is the number of words.

Thus, the control reference pattern candidates that are connected and synthesized are expressed as follows:

$$W^m(1) \oplus W^m(2) \oplus \ldots \oplus W^m(T); m=n \quad (6)$$

where n is the registered speaker number of the verification reference pattern.

A plurality of these control reference pattern candidates are thus formed. Pattern matching is then effected between these control reference pattern candidates and the verification reference pattern to determine the distances. From these distances are selected k smallest distances, and the control reference pattern candidates providing such small distances are selected as the control reference patterns.

At the time of verification, the distance between the input pattern of the speaker to be verified and the verification reference pattern and the distance between the input pattern and the control reference patterns are determined and whether or not the speaker is the registered person is judged on the basis of these distances.

Figure 3:
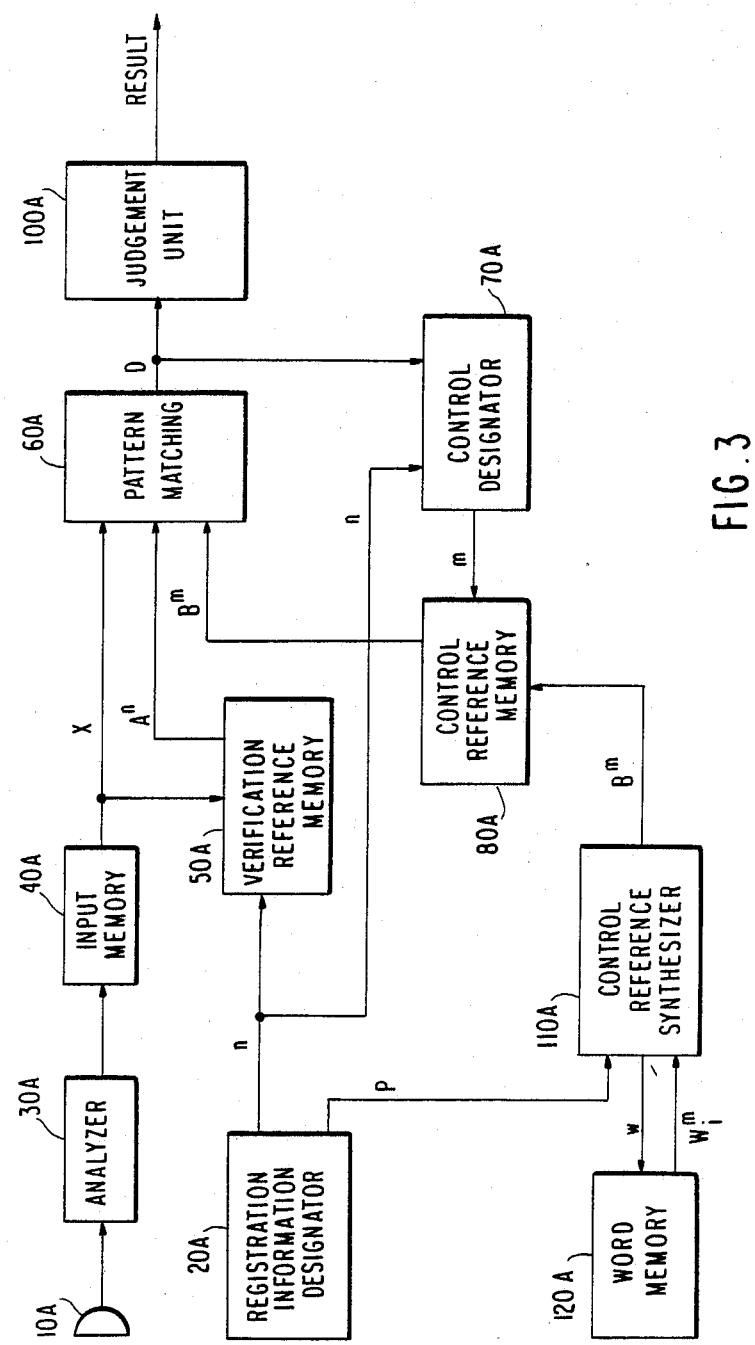
FIG. 3 is a block diagram showing another embodiment of the present invention.

FIG. 3 is a block diagram showing the second embodiment of the present invention. Though its fundamental construction is the same as that of FIG. 1, the segmentation unit 130 is eliminated. The word patterns of predetermined word sets of a predetermined large number of people are stored in advance in a word pattern memory 120A. For instance, the word set is numerals and decimal numeral patterns for 1,000 people are prepared. The set of these word patterns is expressed as follows;

$$\{W_i^m; i=1, 2, \ldots, 10 : m=1, 2, \ldots, 1000\} \quad (7)$$

First of all, the operation relating to registration will be explained. A registered information designator 20A consists of a keyboard, and the information of the person to be registered, that is, the registered speaker number n, is inputted through the keyboard. Next, when the password /543/ is inputted, and the password word train signal P(/543/) is outputted from the keyboard. The corresponding speech is inputted from a microphone 10A. This speech is analyzed by an analyzing unit 30A, and the analyzed result (hereinafter called the "input pattern X") is stored in an input buffer 40A. This input pattern X is sent to, and stored in, a verification pattern memory 50A as the verification reference pattern $A^n$ in correspondence to the registered speaker number n.

Subsequently, a control reference pattern synthesizing unit 110A receives the password train signal P from the registered information designation unit 20A, sequentially reads out the word patterns of the speaker specified by m from the word pattern memory 120A in response to a word information signal obtained from the password train signal P. For example, the synthesizing unit 110 reads out the word pattern series $W_5^1$, $W_4^1$, $W_3^1$, $W_5^2$, $W_4^2$, $W_3^2$, ..., $W_5^{1000}$, $W_4^{1000}$, $W_3^{1000}$. The unit 110A connects the word train $W_5^m$, $W_4^m$, $W_3^m$ and outputs the word train as a control reference pattern candidade $B^m$. The control reference pattern candidates $B^m$ are stored in a control reference pattern memory 80A.

A pattern matching unit 60A compares the input pattern X and the control reference pattern $B^m$ sent from the control reference pattern memory 80A to calculate the distance $D(X, B^m)$. A control designation unit 70A compares the distances $D(X, B^m)$ that are sequentially inputted, and the five smallest distances, for example, are determined and the numbers m corresponding to them are sent to the control reference pattern memory 80A. The control pattern memory 80A stores the control reference patterns $B^m$ which have the five smallest distances and eliminates rest of them. The control designation unit 70A stores the numbers m in corespondence to the registered speaker number n as shown in formula (4). In this manner, the verification reference pattern $A^n$ and the control reference patterns $B^m$ are obtained. The processing described above is repeated while changing the registered speaker number whenever a new person to be registered appears.

In the verification operation, the speaker to be verified operates the key of the registered speaker number designator 20A, inputs the registered number n, and inputs the password speech /543/ from the microphone 10A. The password speech is analyzed by the analyzing unit 30A in the same way as at the time of registration, and inputted as the input pattern to the input pattern tuffer 40A.

When the registered number n is inputted to the verification reference pattern memory 50A, the verification reference pattern $A^n$ is outputted. Upon receiving this output, the pattern matching unit 60A first calculates the distance $D(X, A^n)$.

When the registered number n is given to the control designation unit 70A, the control reference pattern designation signal m of the formula (4) is sent to the control reference pattern memory 80A, and the control reference pattern $B^m$; $\{m=m(n, 1), m(n, 2), \ldots, m(n, 5)\}$ is read out and sent to the pattern matching unit 60A.

The pattern matching unit 60A compares the input pattern X with these control reference patterns $B^m$ and calculates the distances $D(X, B^m)$ $m=m(n, 1)$, $m(n, 2)$, ..., $m(n, 5)$.

A judgment unit 100A compares the distance $D(X, A^n)$ with the distances $D(X, B^m)$ and judges the speaker as the registered person only when $D(X, A^n)$ is smaller than all the distances $D(X, B^m)$ and is smaller than a predetermined threshold value.

In this embodiment, in order to obtain the synthesis information of the control reference pattern candidates, the speaker to be verified must input the password through the keyboard of the unit 20A, but it is possible to synthesize without the password information. That is, all the combinations of the word train are used as the control reference pattern candidates, and the control reference patterns are selected from them according to the distances from the verification reference pattern.

What is claimed is:

1. A speaker verification system comprising:
    a verification reference pattern memory having addresses which are accessed by speaker identification numbers of registered speakers including a speaker to be verified and are for storing verification reference patterns representative of passwords spoken by said registered speakers;
    a speech segment pattern memory for storing speech segment patterns representative of predetermined speech segments spoken by a plurality of speakers including said speaker to be verified;
    synthesis means for synthesizing control reference pattern candidates representative of said passwords by connecting said speech segment patterns;
    control reference pattern determination means for calculating individual dissimilarities between said verification reference patterns and said control reference pattern candidates and for choosing a predetermined number of control reference patterns from among said control reference pattern candidates based upon said dissimilarities;
    input means for inputting an input identification number and an input pattern representative of one of said passwords that is spoken to represent one of said verification reference patterns by said speaker to be verified, said input identification number being a speaker identification number of said speaker to be verified;
    calculating means for calculating a first dissimilarity between said input pattern and one of said verification reference patterns that is accessed in said verification reference pattern memory by said input identification number, said calculating means also for calculating a second dissimilarity between said input pattern and each of said control reference patterns; and judgment means for judging whether or not said speaker to be verified is one of said registered speakers based on said first and second dissimilarities.

2. A speaker verification system according to claim 1, wherein said input means comprises means for converting the passwords spoken by said registered speakers and by said speaker to be verified to an electrical speech signal and means for analyzing said electrical speech signal to determine feature parameters of said verification reference patterns and of said input pattern.

3. A speaker verification system according to claim 2, further comprising segmentation means for segmenting one of said verification reference patterns to provide the speech segment patterns for use by said synthesis means, said one of the verification reference patterns being derived by said converting and said analyzing means from one of said passwords that is spoken by each of said registered speakers.

4. A speaker verification system according to claim 1 wherein
said control reference pattern determination means comprises said calculating means; and wherein said speaker verification system further comprises registered information designation means responsive to said individual dissimilarities for choosing said control reference patterns from among said control reference pattern candidates.

5. A speaker verification system according to claim 4, wherein said registered information designation means comprises
a control designator responsive to said individual dissimilarities for producing a control reference pattern designation signal; and
a control reference pattern memory for memorizing as said control reference patterns, said predetermined number of chosen reference pattern candidates that are chosen from among said control reference pattern candidates based on said control references pattern designation signal.

6. A speaker verification system according to claim 1, wherein said judgment means judges the speaker to be verified as said one of the registered speakers when said first dissimilarity is greater than said second dissimilarity and also when said first dissimilarity is less than a predetermined threshold value.

7. A speaker verification system according to claim 1, wherein a distance is used as said dissimilarity.

8. A speaker verification system according to claim 1, wherein the number of said control reference pattern candidates used in said control pattern determination means is greater than 1.

9. A speaker verification system comprising:
a verification reference pattern memory having addresses which are accessed by speaker identification numbers of registered speakers including a speaker to be verified and for storing verification reference patterns representative of passwords spoken by said registered speakers;
segmentation means for segmenting one of said verification reference patterns into vowel patterns and consonant patterns, said one of said verification reference patterns representing one of said passwords that is spoken by each of said registered speakers;
a vowel pattern memory for storing th vowel patterns obtained by segmenting said verification reference patterns;
synthesis means for synthesizing control reference pattern candidates representative of said passwords by connecting said vowel patterns read from said vowel pattern memory with said consonant patterns segmented from said verification reference pattern;
control reference pattern determination means for calculating individual dissimilarities between said verification reference patterns and said control reference pattern candidates and for choosing a predetermined number of control reference patterns from among said control reference pattern candidates based upon said dissimilarities;
input means for inputting an input identification number and an input pattern representative of one of said spoken passwords to represent one of said verification reference patterns by said speaker to be verified, said input identification number being one of said speaker identification numbers of said speaker t be verified;
calculating means for calculating a first dissimilarity between said input pattern and one of said verification reference patterns that is accessed in said verification reference pattern memory by said input identification number, said calculating means also for calculating a second dissimilarity between said input pattern and each of said control reference patterns; and
judgment means for judging whether or not said speaker to be verified is one of said registered speakers based on said first and second dissimilarities.

10. A speaker verification system comprising:
a verification reference pattern memory having addresses which are accessed by speaker identification numbers of registered speakers including a speaker to be verified and for storing verification reference patterns representative of passwords spoken by said registered speakers;
a word pattern memory for storing word patterns representative of a predetermined set of words spoken by a plurality of speakers including said speaker to be verified;
synthesis means for synthesizing control reference pattern candidates representative of said passwords by connecting the word patterns read out from said word pattern memory;
control reference pattern determination means for calculating individual dissimilarities between said verification reference patterns and said control reference patterns and for choosing a predetermined number of control reference patterns from among said control reference pattern candidates based upon said dissimilarities;
input means for inputting an input identification number and an input pattern representative of one of said passwords that is spoken to represent one of said verification patterns by said speaker to be verified, said input identification number being a speaker identification number of said speaker to be verified;

calculating means for calculating a first dissimilarity between said input pattern and one of said verification reference patterns that is accessed in said verification reference pattern memory by said input identification number, said calculating means also for calculating a second dissimilarity between said input pattern and each of said control reference patterns; and judgment means for judging whether or not said speaker to be verified is one of said registered speakers based on said first and second dissimilarities.

11. A speaker verification system according to claim 10, wherein said word patterns stored in said word pattern memory are numerical words.

* * * * *

UNITED STATES PATENT AND TRADEMARK OFFICE
CERTIFICATE OF CORRECTION

PATENT NO. : 4,910,782
DATED : March 20, 1990
INVENTOR(S) : Masao Watari

It is certified that error appears in the above-identified patent and that said Letters Patent is hereby corrected as shown below:

Column 1, line 54, delete "he" and insert --the--.

Column 1, line 66, delete "b" and insert --be--.

Column 3, line 32, delete "$\partial$ /" and insert --/ə/--.

Column 5, line 18, delete "$V_{[u]}$," and insert --$V_{[u]}'$--.

Column 5, line 60, delete "tee" and insert --the--.

Column 10, line 4, delete "th" and insert --the--.

Column 10, line 26, delete "t" and insert --to--.

Signed and Sealed this

Second Day of July, 1991

Attest:

HARRY F. MANBECK, JR.

Attesting Officer    Commissioner of Patents and Trademarks